(12) United States Patent
Morais et al.

(10) Patent No.: US 7,031,473 B2
(45) Date of Patent: Apr. 18, 2006

(54) NETWORK ARCHITECTURE FOR SECURE COMMUNICATIONS BETWEEN TWO CONSOLE-BASED GAMING SYSTEMS

(75) Inventors: Dinarte R. Morais, Redmond, WA (US); Ling T. Chen, Bellevue, WA (US); Mark D. VanAntwerp, Redmond, WA (US); Boyd C. Multerer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 911 days.

(21) Appl. No.: 10/053,342

(22) Filed: Nov. 13, 2001

(65) Prior Publication Data

US 2003/0093669 A1    May 15, 2003

(51) Int. Cl.
*H04K 1/00* (2006.01)
*A63F 9/24* (2006.01)
*A63F 13/00* (2006.01)
*G06F 17/00* (2006.01)
*G06F 19/00* (2006.01)

(52) U.S. Cl. .......................... 380/251; 463/29; 463/40; 463/42

(58) Field of Classification Search ............... 380/251, 380/252, 277
See application file for complete search history.

(56) References Cited

U.S. PATENT DOCUMENTS 5,586,257 A * 12/1996 Perlman ...................... 463/42
6,006,266 A * 12/1999 Murphy et al. ............. 709/227
6,028,933 A    2/2000 Heer et al.
6,119,229 A    9/2000 Martinez et al.
6,152,824 A * 11/2000 Rothschild et al. ........... 463/42
6,468,160 B1  10/2002 Eliott
6,712,704 B1   3/2004 Eliott
6,769,989 B1   8/2004 Smith et al.
2002/0071557 A1 * 6/2002 Nguyen ...................... 380/251
2002/0104019 A1 * 8/2002 Chatani et al. ............. 713/201
2004/0162137 A1  8/2004 Eliott

OTHER PUBLICATIONS

Documentation of the DVD Region X for Playstation 2, 2001-2002.

* cited by examiner

*Primary Examiner*—Gilberto Barron, Jr.
*Assistant Examiner*—Kristin Derwich
(74) *Attorney, Agent, or Firm*—Lee & Hayes, PLLC (57) ABSTRACT

A network architecture for console-based gaming systems enables secure communication among multiple game consoles over a local area network. The system architecture supports a three-phase secure communication protocol. The first phase involves generating shared keys that are unique to an authentic game console running an authentic game title. In the second phase, a "client" console attempts to discover existing game sessions being hosted by a "host" game console by broadcasting a request over the local area network. The broadcast request is protected using the shared keys. If the host console agrees to let the client console play, the host console generates session keys that are returned to the client console. The third phase involves a key exchange in which the client and host consoles exchange data used to derive one or more secrets for securing future communications. The key exchange is protected using the session keys.

54 Claims, 6 Drawing Sheets

NETWORK ARCHITECTURE FOR SECURE COMMUNICATIONS BETWEEN TWO CONSOLE-BASED GAMING SYSTEMS

TECHNICAL FIELD

This invention relates to console-based gaming systems, and more particularly, to methods for establishing secure communications between two gaming systems connected via a local area network.

BACKGROUND

Traditionally, gaming systems with a dedicated console were standalone machines that accommodated a limited number of players (e.g., 2–4 players). Personal computer-based gaming grew in popularity in part due to the ability to play games online with many remote players over the Internet. Thus, one trend for dedicated gaming systems is to provide capabilities to facilitate gaming over a network, such Internet-based online gaming and LAN-based gaming where multiple consoles are connected through a local area network (LAN).

One challenge in network gaming is to protect network traffic between any two game consoles from tampering or observation by other devices on the network. Gamers are notorious for developing creative cheating mechanisms. For example, gamers have used computers to display portions of a game map which would otherwise not be visible, or modified unprotected network traffic to give themselves advantages during play, such as perfect aim, faster players, and so on. Unfortunately, previous console-based gaming systems did not provide for secure communications.

Accordingly, there is a need for a system architecture that supports secure communications between two or more gaming systems over a local area network.

SUMMARY

A network architecture for console based gaming systems is described. The architecture allows multiple game consoles to establish secure communication over a local area network.

In the described implementation, the system architecture supports a three-phase secure communication protocol. The first phase involves generating shared keys that are unique to an authentic game console running an authentic game title. The same game consoles running the same games will create the same shared keys. In the second phase, a "client" console attempts to discover existing game sessions being hosted by a "host" game console by broadcasting a request over the local area network. The broadcast request expresses a desire to join in playing the game at the next convenient opportunity. The broadcast request is protected using the shared keys. If the host console agrees to let the client console play, the host console generates session keys that are returned securely to the client console. The third phase involves a key exchange in which the client and host consoles exchange data used to derive one or more secrets. The key exchange is protected using the session keys. The secrets are then used to establish a secure point-to-point link between the two consoles for ongoing communication.

DETAILED DESCRIPTION

The following discussion is directed to console-based gaming systems and techniques for establishing secure communications between multiple gaming systems connected via a local area network (LAN). The discussion assumes that the reader is familiar with basic cryptography principles, such as encryption, decryption, authentication, hashing, and digital signatures. For a basic introduction to cryptography, the reader is directed to a text written by Bruce Schneier and entitled, "Applied Cryptography: Protocols, Algorithms, and Source Code in C," published by John Wiley & Sons, copyright 1994 (second edition 1996), which is hereby incorporated by reference.

Gaming System

Figure 1:
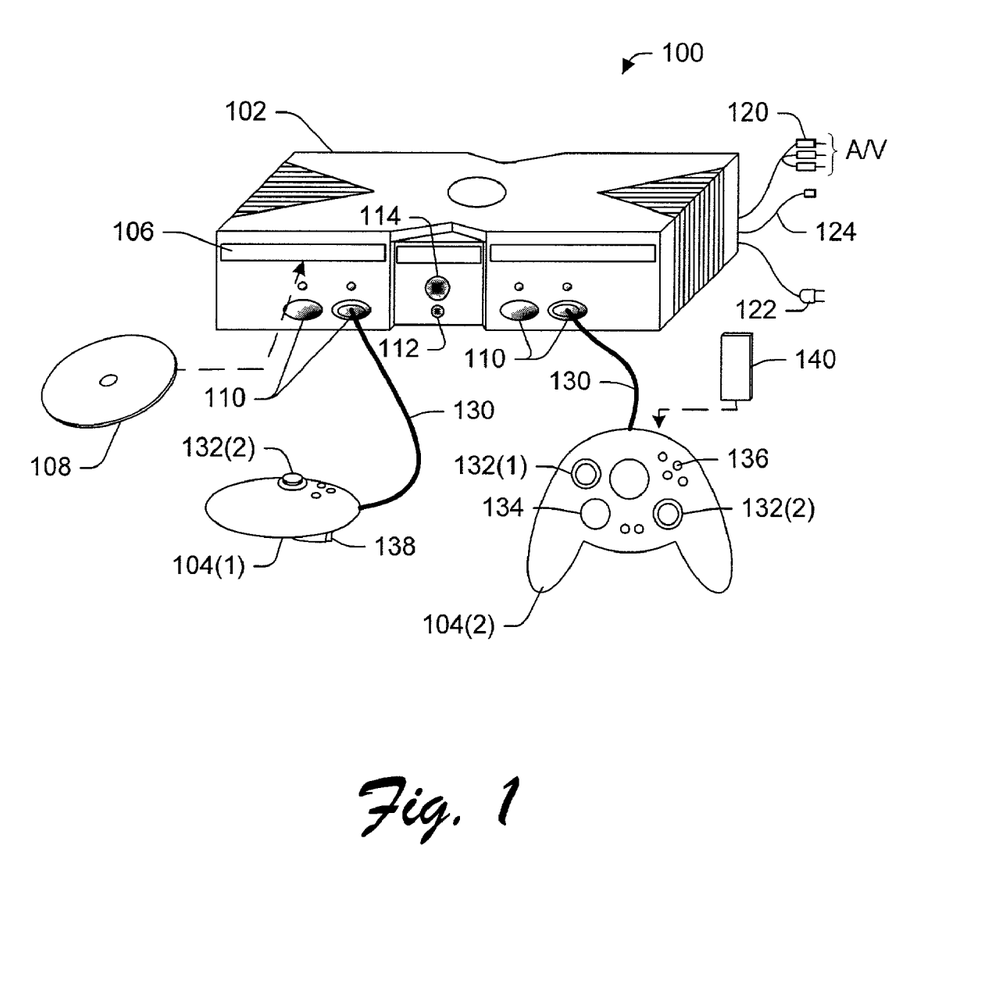
FIG. 1 illustrates a gaming system with a game console and one or more controllers.

FIG. 1 shows an exemplary gaming system 100. It includes a game console 102 and up to four controllers, as represented by controllers 104(1) and 104(2). The game console 102 is equipped with an internal hard disk drive and a portable media drive 106. The portable media drive 106 supports various forms of portable storage media as represented by optical storage disc 108. Examples of suitable portable storage media include DVD, CD-ROM, game discs, game cartridges, and so forth.

The game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

The game console 102 connects to a television or other display (not shown) via A/V interfacing cables 120. A power cable 122 provides power to the game console. The game console 102 may further be equipped with internal or externally added network capabilities, as represented by the cable or modem connector 124 to facilitate access to a network, such as a local area network (LAN) or the Internet.

Each controller 104 is coupled to the game console 102 via a wire or wireless interface. In the illustrated implementation, the controllers are USB (Universal Serial Bus) compatible and are connected to the console 102 via serial cables 130. The controller 102 may be equipped with any of a wide variety of user interaction mechanisms. As illustrated in FIG. 1, each controller 104 is equipped with two thumb-sticks 132(1) and 132(2), a D-pad 134, buttons 136, and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and transport them for play on other consoles. In the described implementation, each controller is configured to accommodate two memory units 140, although more or less than two units may be employed in other implementations.

The gaming system 100 is capable of playing, for example, games, music, and videos. With the different storage offerings, titles can be played from the hard disk drive or the portable medium 108 in drive 106, from an online source, or from a memory unit 140. A sample of what the gaming system 100 is capable of playing back includes:

1. Game titles played from CD and DVD discs, from the hard disk drive, or from an online source.
2. Digital music played from a CD in the portable media drive 106, from a compressed file on the hard disk drive (e.g., Windows Media Audio (WMA) format), or from online streaming sources.
3. Digital audio/video played from a DVD disc in the portable media drive 106, from a file on the hard disk drive (e.g., Windows Media Video (WMV) format), or from online streaming sources.

Figure 2:
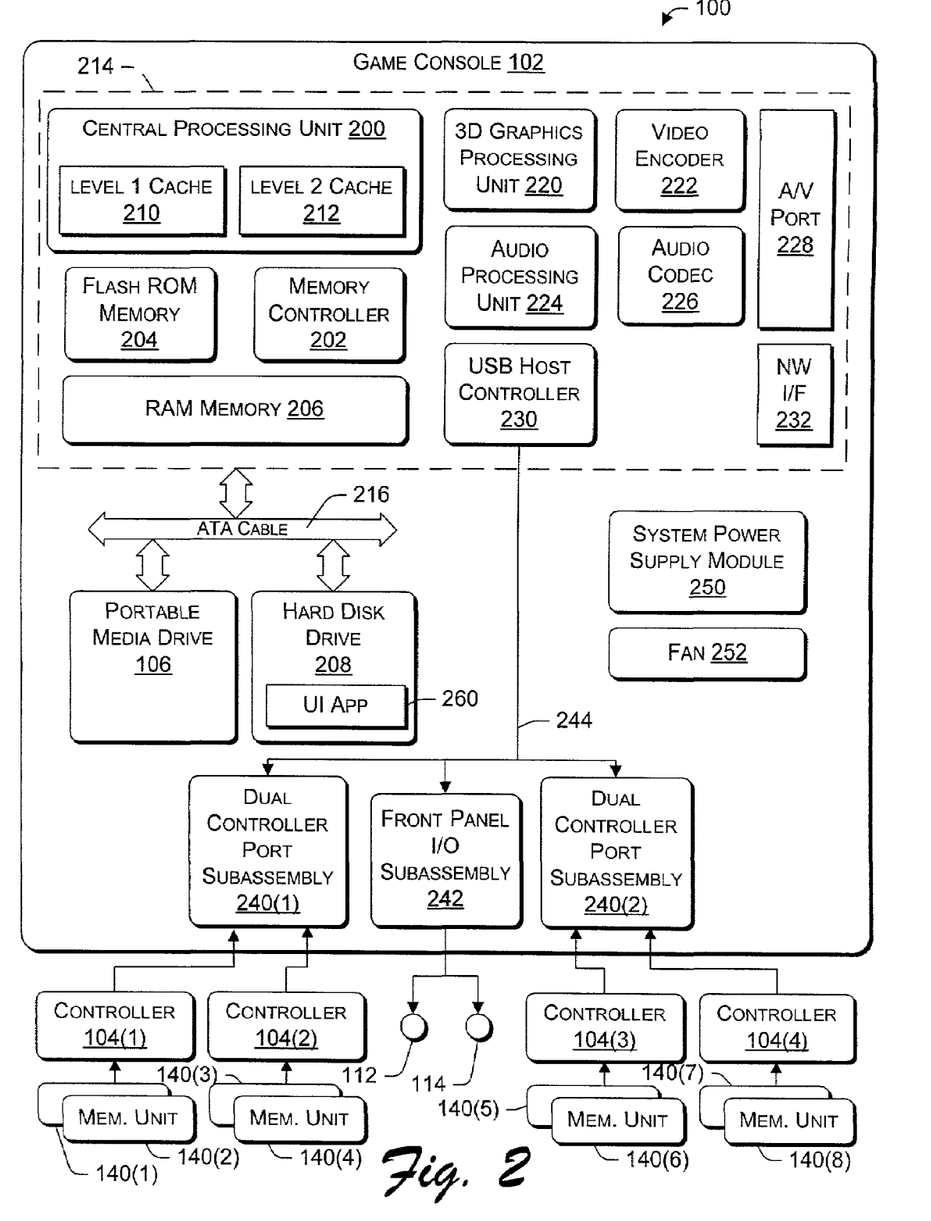
FIG. 2 is a block diagram of the gaming system.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) modules that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220–228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)–104(4). The network interface 232 provides access to a network (e.g., LAN, Internet, etc.) and may be any of a wide variety of various wired or wireless interface components including an Ethernet card, a modem, a Bluetooth module, a cable modem, and the like.

The game console 102 has two dual controller support subassemblies 240(1) and 240(2), with each subassembly supporting two game controllers 104(1)–104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)–140(8) are illustrated as being connectable to the four controllers 104(1)–104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

A console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The game console 102 implements a cryptography engine to perform common cryptographic functions, such as encryption, decryption, authentication, digital signing, hashing, and the like. The cryptography engine may be implemented as part of the CPU 200, or in software stored in memory (e.g., ROM 204, hard disk drive 208) that executes on the CPU, so that the CPU is configured to perform the cryptographic functions.

The gaming system 100 may be operated as a standalone system by simply connecting the system to a television or other display. In this standalone mode, the gaming system 100 allows one or more players to play games, watch movies, or listen to music. However, with the integration of network connectivity made available through the network interface 232, the gaming system 100 may further be operated as a participant in a larger network gaming community. This network gaming environment is described next.

Network Gaming

Figure 3:
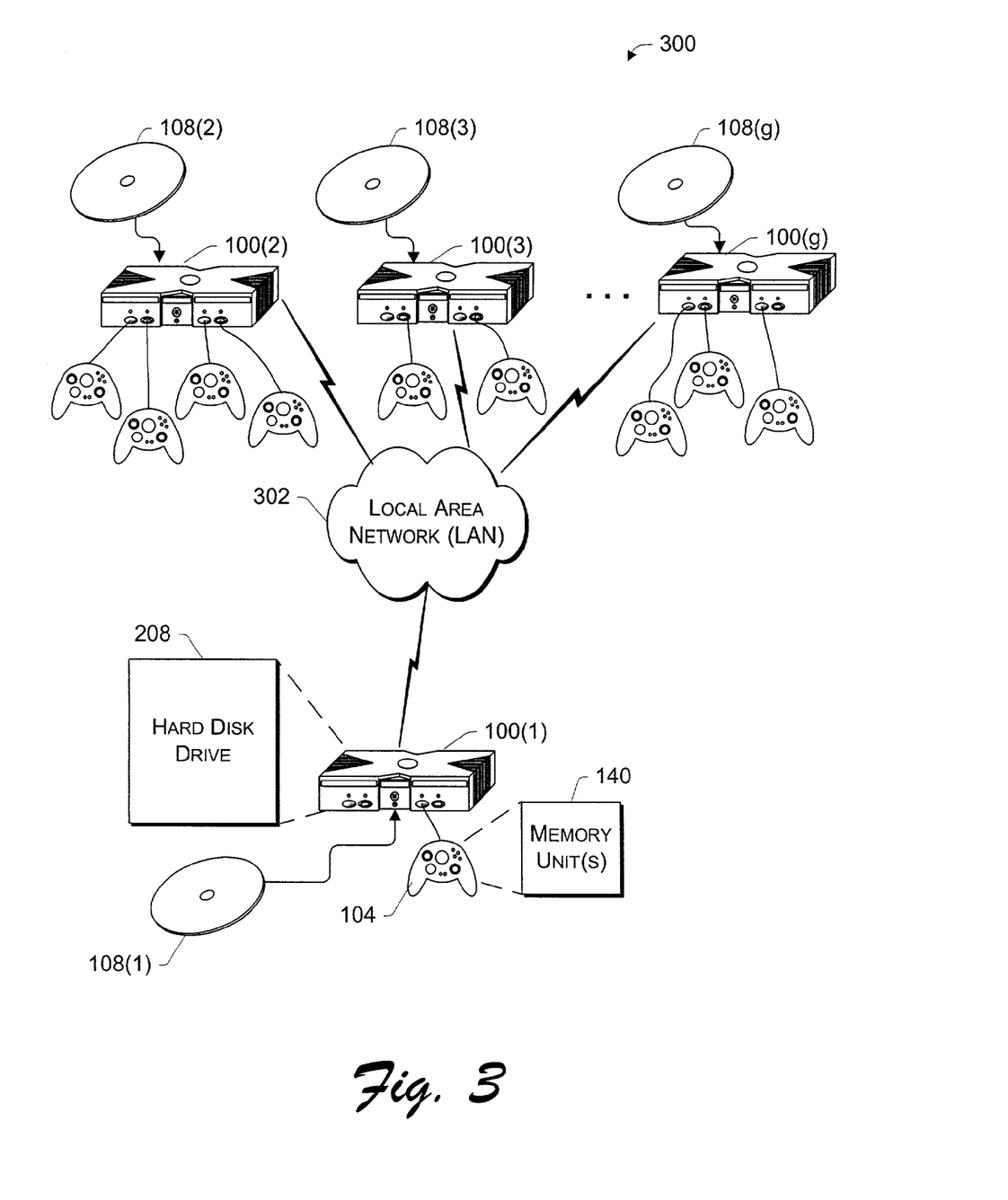
FIG. 3 illustrates a network gaming system in which the FIG. 1 gaming system is connected via a local area network to other gaming systems.

FIG. 3 shows an exemplary network gaming environment 300 in which multiple gaming systems 100(1), 100(2), . . . , 100(g) are interconnected via a local area network 302. LAN 302 may be implemented using any one or more of a wide variety of conventional communications media including both wired and wireless media. As one example, the LAN 302 represents an Ethernet cross-over cable or an Ethernet hub. Other possible implementations of LAN 302 include FireWire (specifically, IEEE 1394) and universal serial bus (USB).

Many game titles are scalable to support multiple players on different consoles. Interconnecting multiple gaming systems via the LAN 302 enables multiple players to compete in the same game. For example, some game titles allow up to 16 different players, which can be composed of any combination of players and gaming systems (e.g., from one player each on 16 gaming systems to four players each on four gaming systems).

A network-based game is hosted by one of the game consoles. For discussion purposes, suppose that gaming system 100(1) hosts the game for client gaming systems 100(2), . . . , 100(g). In this context, the hosting function is one of coordinating player access to the multiplayer game. The "hosting" metaphor is not meant to imply that one game console serves the game content to other game consoles. Each game console 100 has its own copy of the game stored either on the hard disk drive 208 (e.g., purchased and downloaded an authentic game title from a vendor's website) or the portable storage medium as represented by a digital video disk (DVD) 108(1), 108(2), . . . , 108(g).

Secure Communication Protocol

All game consoles involved in a network gaming situation initially establish secure communication links between one another. Secure communications means that data can be transferred between two entities in a manner that is resistant to tampering. The transferred data can be authenticated by the entities to ensure that a trusted entity did indeed send that particular data. Secure communications may or may not involve encryption, which effectively renders the transmitted data blind to an observer. If encryption is used, it may occur before or after authentication.

With reference to FIG. 3, each client game console 100(2)-(g) that wants to participate seeks permission from the host gaming system 100(1). If the host is willing, secure communications are established between the requesting client console and the host console. Establishment of a secure communications link is accomplished by a three phase process. Briefly, the first phase involves generation of shared secret keys that only an authentic game console running an authentic game title will know. The second phase concerns session discovery in which a client console attempts to discover existing game sessions being hosted by a host game console. During session discovery, the client console broadcasts a discovery request over the local area network. The discovery request expresses a desire to join the LAN-based game at the next convenient opportunity. The discovery request is protected using the shared keys. If the host console agrees to let the client console play, the host console generates a discovery reply containing session keys. The discovery reply is returned to the client console via broadcast, directly, or indirectly. The third phase involves a key exchange in which the client and host consoles exchange data used to derive one or more secrets. The key exchange is protected using the session keys. The secrets are then used to establish a secure point-to-point link between the multiple consoles for ongoing communication.

These phases will be described below in more detail according to one possible implementation of the secure communication protocol.

Phase I: Generate Shared Secret Keys

Figure 4:
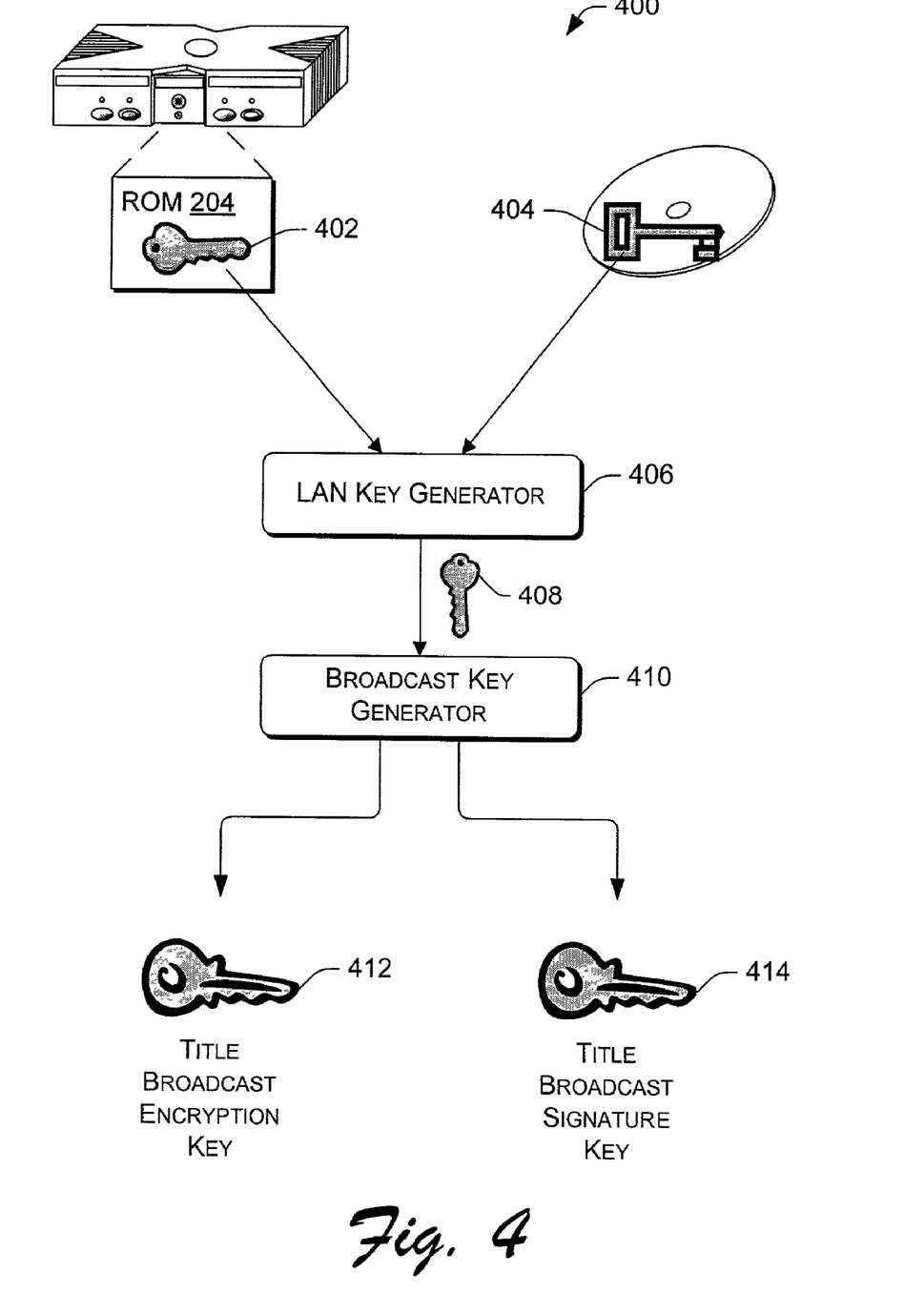
FIG. 4 illustrates a first phase of a secure communication process in which a game console running an authentic game title generates shared secret keys.

FIG. 4 shows the first phase 400 of the secure communication protocol in which a shared secret key that is unique to an authentic gaming system running an authentic game title is generated. The console stores a secret key 402 in a secure location, such as in a protected portion of ROM 204. Additionally, each game title certified to play on the gaming system has an associated unique, randomly-generated title key 404. The title key 404 is the same for every copy of the same game title. Different titles have different title keys. The title key 404 may be stored as part of the game title, such as on the DVD or with a softcopy of the game title that was legitimately purchased online and downloaded for storage on the hard disk drive of the game console.

A LAN key generator 406 uses the console-based key 402 and the title-based key 404 to derive a LAN key 408. In one implementation, the LAN key generator 406 computes a one-way cryptographic function using the two keys 402 and 404 during a network stack initialization. As one example of a suitable cryptographic function, the LAN key generator 406 concatenates the keys 402 and 404 and performs an HMAC-SHA-1 (Hashed Message Authentication Code—Secure Hash Algorithm 1) operation on them to produce the LAN key 408.

The LAN key 408 is then used to produce shared secret keys. More particularly, when the network stack is initialized, a broadcast key generator 410 uses the LAN key 408 to generate a title broadcast encryption key 412 and a title broadcast signature key 414. As one example, the generator 410 may create keys for symmetric ciphers, asymmetric ciphers, hashing algorithms, and digest algorithms.

Generation of the broadcast keys 412 and 414 is performed once during initialization. All gaming systems running the same title will generate the same pair of keys. Any gaming system running a different title on the same LAN will have a different pair of keys. The combination of keys prevents anyone from discovering how to intercept or modify broadcast messages for a particular game simply by being able to read the game title.

Phase II: Session Discovery

Figure 5:
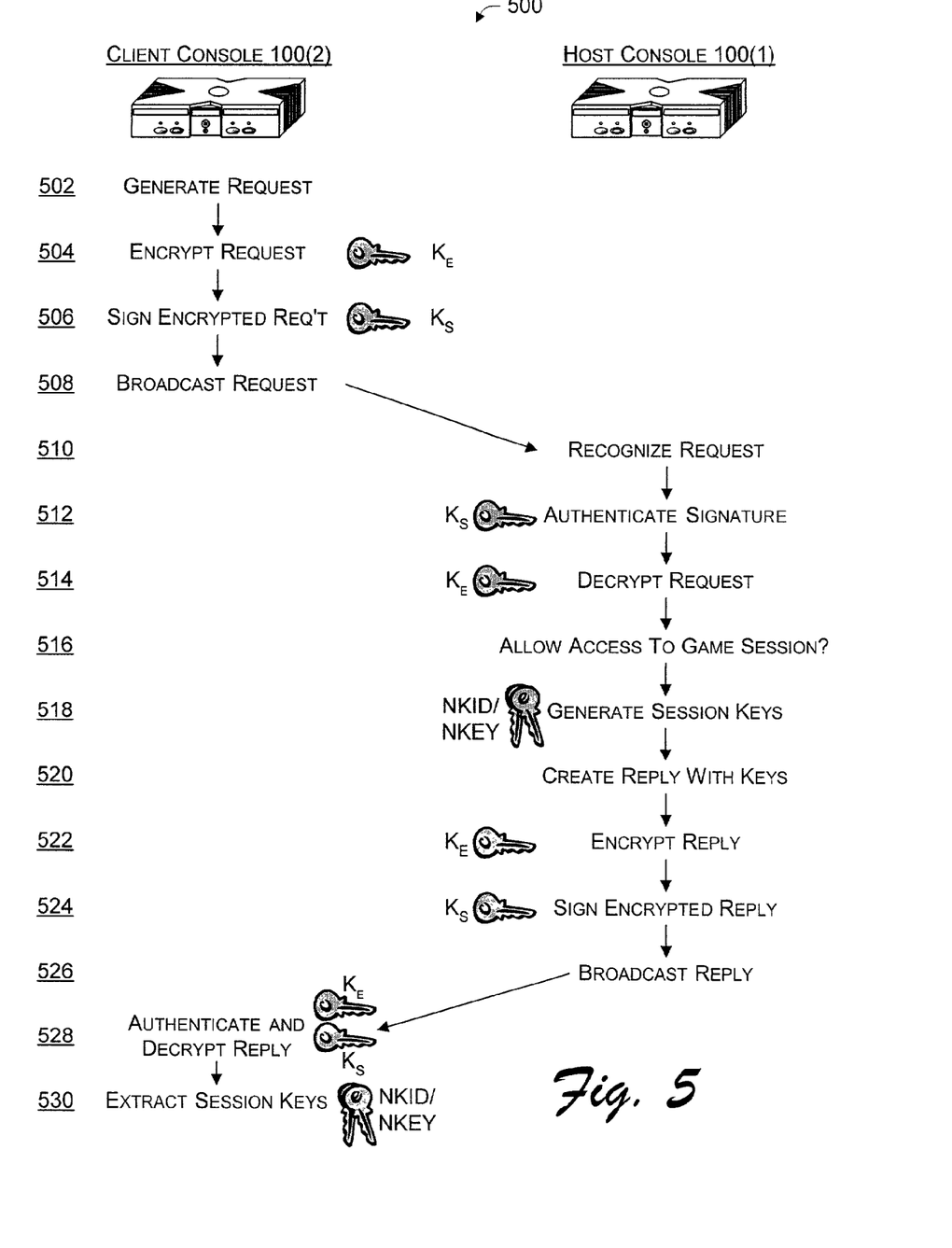
FIG. 5 illustrates a second phase of the secure communication process in which a client game console discovers a host game console on the local area network.

FIG. 5 shows the second phase 500 of the secure communication protocol in which a client console attempts to discover whether any other consoles on the LAN are currently hosting a multiplayer game session of a particular title. With only a few consoles connected on a small local area network, there is not expected to be more than one or two consoles currently hosting a particular game. With small numbers of consoles, there is no third-party matchmaking service and hence the client console is left to discover suitable hosts on its own through a broadcast technique. It is noted, however, that in the future the number of available game sessions might be quite large and a dedicated matchmaking service may be used to find a suitable match.

The second phase is described in the context of a general flow of operations performed by a requesting client console 100(2) and a potential host console 100(1). The operations are illustrated beneath the client and host consoles to convey where such operations are performed.

At operation 502, the client console 100(2) generates a request REQ containing a request message and an optional nonce $N_i$ (the initiator's nonce). At operation 504, the client console encrypts the request using a symmetric key cipher E (e.g., DES) that employs the title broadcast encryption key 412 (denoted as $K_E$), as follows:

$$REQ^E = E_{KE}[\text{request message}, N_i].$$

At operation 506, the client console digitally signs the request using the title broadcast signature key 414 (denoted as $K_S$), as follows:

$$REQ^{ES} = S_{KS}[REQ^E].$$

At operation 508, the client console broadcasts the encrypted and signed request $REQ^{ES}$ to other consoles on the LAN 302. The host console 100(1) has previously opened a UDP (User Datagram Protocol) socket and is listening for discovery broadcast messages over the LAN. Consoles running the same game title will recognize the request because they are able to generate the same set of title broadcast keys 412 and 414, and hence can authenticate and decrypt the message. Consoles running different game titles, however, will disregard the message. Assume that one host console exists and is running the same game title (operation 510). Accordingly, the host console is likewise able to derive the title broadcast encryption key 412 and the title broadcast signature key 414 as provided in phase I (FIG. 4).

At operation 512, the host console authenticates the request using the same title broadcast signature key 414. At operation 514, the host console decrypts the message using the same title broadcast encryption key 412, as follows:

$$REQ=D_{KE}[REQ^E].$$

At operation 516, the host console decides whether to allow the requesting client console to participate in the network game. Factors affecting this decision include the number of current players, number of players supported by the game, current status of the game (i.e., just beginning, middle of session, etc.), and so on. Assuming that the host console will accept a new client console with one or more players, the host console generates a unique pair of keys used to distinguish between different sessions (operation 518). These keys include a network key identifier NKID and a network key exchange key NKEY. The identifier NKID is simply a name for the key NKEY. In one implementation, the session keys are created by a random number generator. These keys are used in the key exchange phase described below with reference to FIG. 6. The session key NKEY will be used in the future to authenticate the contents of key exchange packets exchanged between the two consoles, whereas the key identifier NKID is used to specify the game session to which the source console is connecting. It is noted that the session keys NKID and NKEY may be pre-generated prior to receiving any request from a client console.

At operation 520, the host console creates a reply to the discovery request. The reply contains, at a minimum, a reply message, the NKID/NKEY pair, and a network address NADDR of the host game console. The reply message may include the initiator's nonce Ni, a responder's nonce Nr, and game specific data. At operation 522, the host console encrypts the reply using the title broadcast encryption key 412, as follows:

$$REPLY^E=E_{KE}[\text{reply message, NKID, NKEY, NADDR}].$$

At operation 524, the host console signs the reply using the title broadcast signature key 414 (denoted as $K_S$), as follows:

$$REPLY^{ES}=S_{KS}[REPLY^E].$$

At operation 526, the host console broadcasts the reply across the local area network 302 to other consoles, including the requesting client console 100(2). At operation 528, the client console authenticates and decrypts the reply. Every host console responds with its own encrypted broadcast reply containing the network address, as well as an encryption key and identifier specific to that game session. Having discovered one or more hosts available on the network, the client communicates with the desired host using session key pair of that host. Any other session key pairs returned by other potential hosts are discarded.

Phase III: Key Exchange

Figure 6:
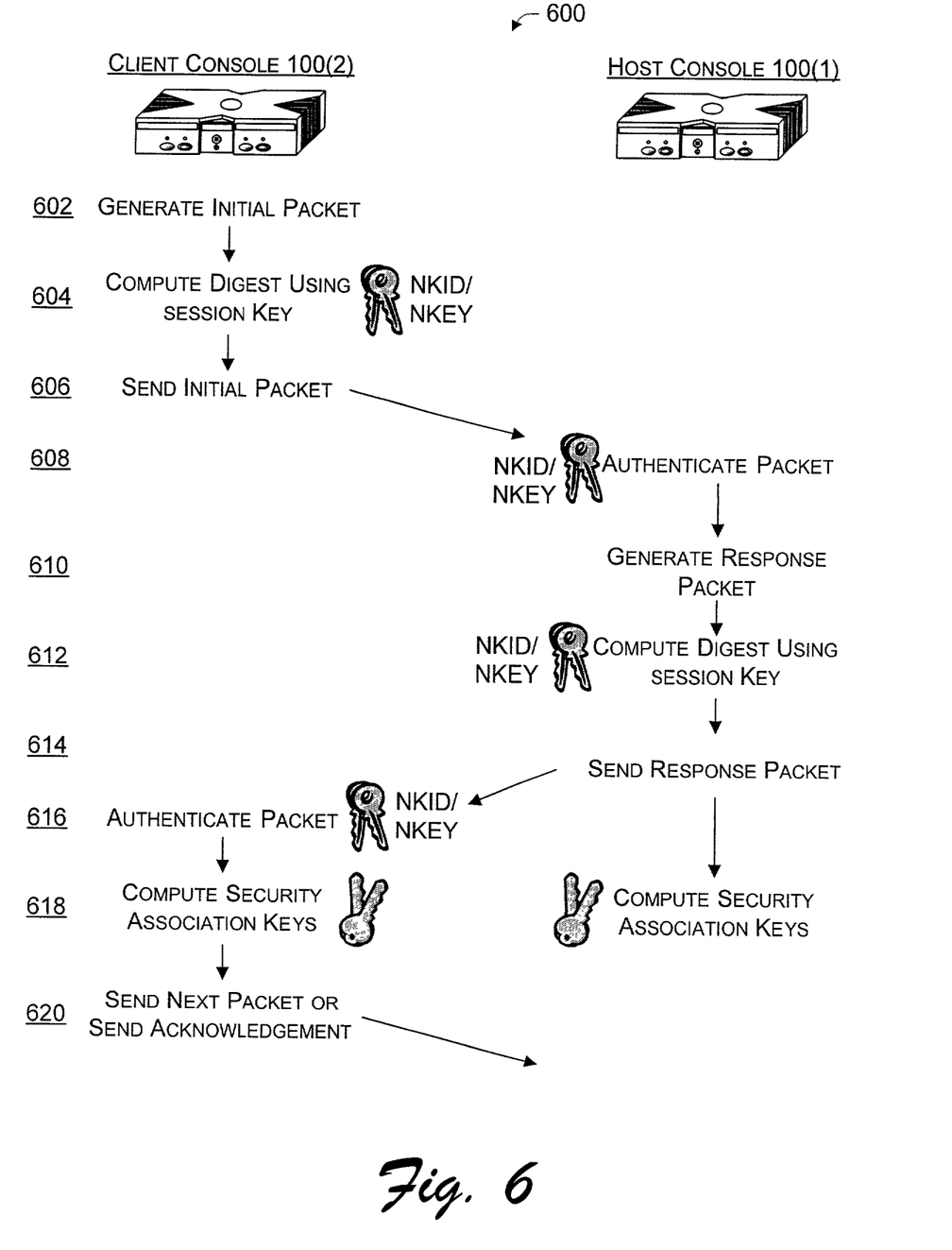
FIG. 6 illustrates a third phase of the secure communication process in which the client and host game consoles establish a point-to-point communication link.

FIG. 6 shows the third phase 600 of the secure communication protocol in which the client and host perform a secure key exchange to establish a secure point-to-point link for ongoing communication. After game session discovery, the client and host consoles share a title broadcast encryption key 412 and a title broadcast signature key 414, as well as a session key pair NKID/NKEY for a particular game session. Now, the client and host consoles exchange data used to derive one or more keys that are used to secure point-to-point communication. In the described implementation, the consoles use Diffie-Hellman exponentiation operations to derive a new secret that is shared between the two consoles without transmitting that secret across the LAN. The key exchange is protected using the session key.

For the discussion purposes, suppose the client console is the initiator of the key exchange and the host is the responder. When the client sends the first packet, the client notices that there is no security association established between the game client and game host. The packet is placed on a packet queue and the key exchange process is started.

At operation 602, the client creates an initial key exchange packet KeyExInit. The packet includes secrets used to derive symmetric keys used to secure communication in a point-to-point communication link. As one exemplary implementation, the key exchange packet is a UDP packet with a payload containing the following data:

| Data Field | Definition |
|---|---|
| NonceInit | This field contains a random nonce created by the initiator. It is used to validate replies and compute keys. |
| NonceResp | This field contains a random nonce created by the responder. It is used to validate replies and compute keys. |
| $g^x$ | This field contains the Diffie-Hellman exponentiation provided by the initiator. |
| NKID | This field specifies the key identifier that identifies the game session key and that both consoles have by virtue of the second phase session discovery. |
| NADDR | This field contains the complete network address information of the sender of the message. |
| Time | This field contains a time value that is used to limit replay attacks. Every time a key exchange packet it transmitted (or retransmitted for timeouts), this value is incremented by one unit and that time is transmitted in the key exchange packet. Should the initiator or responder reboot and attempt to rejoin the same game session (because it reacquired the same NKID/NKEY pair from the game host via broadcast when it came back up), its system time will have moved forward by many thousands if not millions of units. The purpose of this scheme is to prevent the replay of key exchange initiator packets disrupting the security association between a pair of consoles. |
| Hash | This field contains a hash digest of the key exchange packet. |

At operation 604, the client console computes a hash digest of the entire message using the session key NKEY and a hashing function H, as follows:

$$HashInit=H_{NKEY}[NonceInit, g^x, NKID, NADDR, Time].$$

Accordingly, creation of the initial key exchange packet KeyExInit involves generating a random nonce "NonceInit", filling in the computed Diffie-Hellman value "$g^x$", filling in the NKID and NADDR fields, and incrementing and setting the "Time" field. All other fields are zeroed. The hash digest of all preceding fields ("HashInit") is placed in the "Hash" field of the key exchange packet so that the packet can be authenticated by the receiving console (e.g., host console). The resulting packet is as follows:

KeyExInit: [NonceInit, $g^x$, NKID, NADDR, Time, HashInit].

At operation 606, the client console sends the initial key exchange packet KeyExInit to the host console. When this message is received, the host console uses the key identifier in the NKID field to identify the key NKEY of the particular game session. The session key is then used to authenticate the message as originating from the client console (operation 608). More particularly, the host uses the session key NKEY to compute a hash digest of the contents and compare that digest to the attached "HashInit" value received in the initial key exchange packet.

At operation 610, the host console creates a responsive key exchange packet (denoted as "KeyExResp"). In the continuing example, the host console generates a random nonce "NonceResp", fills in its computed value from the Diffie-Hellman function $g^Y$, fills in the NKID and NADDR fields, and increments and sets the "Time" field. The "NonceInit" field is copied from the initial message.

At operation 612, the host console hashes the response packet using the session key NKEY, as follows:

$$HashResp = H_{NKEY}[NonceInit, NonceResp, g^Y, NKID, NADDR, Time].$$

The hash digest is placed in the "Hash" field of the key exchange packet. The response packet now has the following contents:

$$KeyExResp: [NonceInit, NonceResp, g^Y, NKID, NADDR, Time, HashResp].$$

At operation 614, the host console sends the response key exchange packet KeyExResp to the client console. Upon receipt, the client console uses the key identifier in the NKID field to identify the session key NKEY. The session key NKEY is then used to authenticate the message as originating from the host console (operation 616). That is, the client uses the session key NKEY to compute a hash digest of the response packet and compare that digest to the attached "HashResp" value received in the response packet.

At this point, both the host and the client have enough data to compute security association keys (operation 618). Security association keys are used to secure point-to-point communication between two consoles. In this example, each console uses the two Diffie-Hellman exponentiations to compute function $g^{XY}$. Each console can then compute four different digests using NonceInit, NonceResp, and $g^{XY}$ as input, as well as the session key NKEY. These digests are used to form the security association keys.

Once the client has the security association keys, it is free to transmit any packets that have been waiting for key exchange to complete. The host console, however, is not free to do so even though it has the same set of keys because it cannot be sure that its response message KeyExResp was not lost. The host waits until it either receives a KeyExAck message or until it receives a packet authenticated with the computed security association key (operation 620).

In the common case, the client console sends a packet to the host and thus, the key exchange process consists of just two messages—KeyExInit and KeyExResp. Should the client not have a packet to send, it will send an artificial acknowledge message (denoted as "KeyExAck"). This message differs from the two other key exchange messages in that the message is hashed using the computed security association key instead of the session key NKEY.

From this point forward, the two consoles use the security association keys to secure communications. All network packets that need to be transmitted to the other consoles are authenticated after optionally being encrypted, with the receiving console verifying the authentication data before decrypting the packet contents. Once a game session is finished, either console can stop accepting key-exchange requests from any console using this session key pair NKID/NKEY. The duration of the session keys is expected to be anywhere from a few minutes to a few hours.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
   deriving a secret that is unique to a game console running a particular game title; and
   establishing a secure communication link between multiple game consoles over a local area network using the secret.

2. A method as recited in claim 1, wherein the deriving comprises deriving the secret from data stored in the game console and data associated with the particular game title.

3. A method as recited in claim 1, wherein the deriving comprises:
   retrieving a console-based key from the game console and a title-based key associated with the particular game title; and
   deriving the secret from the console-based key and the title-based key.

4. A method as recited in claim 1, wherein the establishing comprises:
   discovering whether another game console on the local area network is hosting the particular game title; and
   exchanging secure communication keys between the multiple game consoles to facilitate secure multi-console play of the particular game title over the local area network.

5. A method as recited in claim 1, wherein the establishing comprises establishing a secure communication link over an Ethernet segment using the secret.

6. A method comprising:
   generating at least one key that is secret to an authentic gaming system running an authentic game title;
   discovering whether another gaming system on a common local area network is hosting the game title; and
   establishing a secure communication link between multiple gaming systems to facilitate multi-system play of the game title over the local area network.

7. A method as recited in claim 6, wherein the generating comprises:
   retrieving a console-based key from the gaming system and a title-based key associated with the game title; and
   deriving the key from the console-based key and the title-based key.

8. A method as recited in claim 6, wherein the discovering comprises broadcasting, over the local area network, a request to join in playing the game title being hosted by another gaming system.

9. A method as recited in claim 8, wherein the discovering comprises receiving a broadcast reply, over the local area network, from the gaming system that is hosting the game title.

10. A method as recited in claim 6, wherein the discovering comprises:

cryptographically encoding, using a generated key, a request to join in playing the game title being hosted by another gaming system; and broadcasting the request over the local area network.

11. A method as recited in claim 6, wherein the discovering comprises broadcasting a request over an Ethernet segment.

12. A method as recited in claim 6, wherein the establishing comprises exchanging secure communication keys between the multiple game consoles to facilitate multi-console play of the particular game title over the local area network.

13. In a networked gaming environment where multiple game consoles are connected via a local area network, a method comprising:

broadcasting, from a client game console over a local area network, a request to join in playing a game title in a network gaming session being hosted by a host game console, the request containing a secret that is unique to the client game console running the game title; and broadcasting, from the host game console over the local area network, a reply to the request, the reply containing information that can be used to establish a secure communication link.

14. A method as recited in claim 13, further comprising deriving the secret from data stored in the client game console and data associated with the game title.

15. A method as recited in claim 13, wherein the local area network comprises an Ethernet segment.

16. A method comprising:

retrieving a console-based key stored on a game console;

retrieving a title-based key associated with a game title running on the game console; and deriving one or more keys from the console-based key and the title-based key.

17. A method as recited in claim 16, wherein the deriving comprises computing a hashing function on a concatenation of the console-based key and the title-based key.

18. One or more computer-readable media comprising computer-executable instructions that, when executed, perform the method as recited in claim 16.

19. In a networked gaming environment where multiple game consoles are connected via a local area network, a method comprising:

creating a request to join in playing a game title being hosted by a host game console on the local area network;

broadcasting the request over the local area network;

receiving a reply from the host game console, the reply containing one or more session keys; and using the session keys from the reply to facilitate future secure communication with the host game console.

20. A method as recited in claim 19, wherein the broadcasting comprises broadcasting the request over an Ethernet segment.

21. A method as recited in claim 19, further comprising cryptographically encoding the request prior to the broadcasting.

22. A method as recited in claim 19, wherein the receiving comprises listening for a reply that is broadcast from the host game console over the local area network.

23. A method as recited in claim 22, wherein the broadcast reply is cryptographically encoded, and further comprising cryptographically decoding the reply.

24. One or more computer-readable media comprising computer-executable instructions that, when executed, perform the method as recited in claim 19.

25. In a networked gaming environment where multiple game consoles are connected via a local area network and at least two game consoles are playing a same game title, a method comprising:

forming an initial packet that contains first data used to derive a cryptographic key;

computing a first hash digest of the initial packet;

sending the initial packet and the first hash digest to another game console on the local area network that is playing the same game title;

receiving a reply packet from the other game console, the reply packet including a second hash digest and second data;

authenticating the reply packet using the second hash digest; and deriving one or more security association keys from the first and second data, the security association keys being used to secure communication between the multiple consoles.

26. One or more computer-readable media comprising computer-executable instructions that, when executed, perform the method as recited in claim 25.

27. In a networked gaming environment where multiple game consoles are connected via a local area network, a method comprising:

retrieving a console-based key from a first game console and a title-based key associated with a game title running on the first game console;

deriving at least one cryptographic key from the console-based key and the title-based key;

creating, at a first console, a request to join in playing the game title being hosted by a second game console on the local area network;

cryptographically encoding the request using the cryptographic key;

broadcasting the request over the local area network;

cryptographically decoding the request, at the second game console, using the cryptographic key;

generating, at the second game console, a reply that contains at least one session key;

cryptographically encoding the reply using the cryptographic key;

broadcasting the reply over the local area network;

cryptographically decoding the reply, at the first game console, using the cryptographic key;

exchanging packets between the first and second game consoles, the packets being protected using the session key and containing data used to derive at least one security association key; and establishing a secure communication link between the first and second game consoles using the security association keys to facilitate secure multi-console play of the game title.

28. A method as recited in claim 27, wherein the deriving comprises computing a hashing function on a concatenation of the console-based key and the title-based key.

29. A method as recited in claim 27, wherein:

the deriving comprises computing an encryption key and a signature key; and the encoding of the request comprises encrypting the request using the encryption key to form an encrypted request and digitally signing the encrypted request using the signature key.

30. A method as recited in claim 27, wherein the exchanging comprises:

forming, at one of the first or second game consoles, a packet that contains the data used to derive the security association key;

computing a hash digest of the packet;

sending the packet and the hash digest to the other of the first or second game consoles; and authenticating the packet using the hash digest at the other first or second game consoles.

31. A method as recited in claim 27, wherein the data used to derive the security association key comprises values used by a cryptographic Diffie-Hellman function.

32. One or more computer-readable media comprising computer-executable instructions that, when executed, perform the method as recited in claim 27.

33. In a networked gaming environment where multiple game consoles are connected via a local area network, a method comprising:

retrieving a console-based key from a first game console and a title-based key associated with a game title running on the first game console;

deriving at least one cryptographic key from the console-based key and the title-based key;

creating a request to join in playing the game title being hosted by another game console on the local area network;

encoding the request using the cryptographic key;

broadcasting the request over the local area network;

receiving a reply from a host game console, the reply containing at least one session key;

exchanging packets with the host game console, the packets being protected using the session key and containing data used to derive at least one security association key; and establishing a secure communication link with the host game console using the security association key.

34. A method as recited in claim 33, wherein the receiving comprises listening for a reply that is broadcast from the host game console over the local area network.

35. One or more computer-readable media comprising computer-executable instructions that, when executed, perform the method as recited in claim 33.

36. In a networked gaming environment where multiple game consoles are connected via a local area network, a method comprising:

retrieving a console-based key from a first game console and a title-based key associated with a game title running on the first game console;

deriving at least one cryptographic key from the console-based key and the title-based key;

receiving a request to join in playing the game title from another game console on the local area network;

cryptographically decoding the request using the cryptographic key;

generating a reply that contains at least one session key;

encoding the reply using the cryptographic key;

sending the reply over the local area network;

exchanging packets with the other game console, the packets being protected using the session key and containing data used to derive at least one security association key; and establishing a secure communication link with the other game console using the security association key.

37. A method as recited in claim 33, wherein the sending comprises broadcasting the reply over the local area network.

38. One or more computer-readable media comprising computer-executable instructions that, when executed, perform the method as recited in claim 33.

39. A computer-readable medium for a game console comprising computer-executable instructions that, when executed, direct the game console to:

obtain a first key stored in memory of the game console and a second key associated with a game title running on the game console; and derive one or more keys from the first and second keys.

40. A computer-readable medium for a game console comprising computer-executable instructions that, when executed, direct the game console to:

encrypt a request to join in playing a game title being hosted by a remote host game console on a local area network;

digitally sign the request;

broadcast the request over the local area network;

listen for at least one broadcast reply from the host game console;

upon receipt of the reply, extract at least one session key from the reply for use in facilitating future communication with the host game console;

form an initial packet that contains first data used to derive a cryptographic key;

compute a first hash digest of the initial packet using the session key;

send the initial packet and the first hash digest to the host game console;

listen for a reply packet from the host game console, the reply packet including a second hash digest and second data;

authenticate the reply packet using the session key and the second hash digest; and derive at least one security association key from the first and second data, the security association keys being used to secure communication with the host game console.

41. A computer-readable medium for a game console comprising computer-executable instructions that, when executed, direct the game console to:

receive a request from a remote game console on a local area network, the request seeking network play of a game title;

authenticate the request as being generated by an authentic game console running an authentic version of the game title;

decode the request;

determine whether to allow the remote game console to play;

in an event the remote game console is allowed to play, create a reply with containing at least one session key;

encrypt and digitally sign the reply;

send the reply to the remote game console;

receive an initial packet directly from the remote game console, the initial packet containing first data used to derive a cryptographic key;

authenticate the initial packet using the session key;

form a response packet holding second data used to derive a cryptographic key;

send the response packet to the remote game console; and derive at least one security association key from the first and second data, the security association keys being used to secure communication with the remote game console.

42. A computer-readable medium as recited in claim 41, further comprising computer-executable instructions that, when executed, direct the game console to broadcast the response packet over the local area network.

43. A game console, comprising:
a memory to store a first key;
a game title configured to execute on the game console, the game title having an associated second key; and
a processor coupled to the memory, the processor being configured to derive at least one cryptographic keys from the first and second keys.

44. A game console as recited in claim 43, wherein the memory comprises a read only memory.

45. A game console as recited in claim 43, wherein the processor is configured to compute a hash function of the first and second keys.

46. A game console as recited in claim 43, wherein the processor is further configured to discover another game console on a local area network that is hosting the game title.

47. A game console as recited in claim 43, wherein the processor is further configured to use the cryptographic key to establish a secure communication link with a remote game console over a local area network.

48. A game console, comprising:
a memory; and
a processor coupled to the memory and configured to generate at least one key that is secret to the game console when running an authentic game title, the processor being further configured to discover, using the key, a host game console on a common local area network that is hosting the game title and to establish a secure communication link with the host game console over the local area network.

49. A game console as recited in claim 48, wherein the processor is configured to derive the key from data stored in the memory and data associated with the authentic game title.

50. A game console as recited in claim 48, wherein the processor is further configured to discover a host game console by creating a request to join in playing the game title and broadcasting the request over the local area network.

51. A game console as recited in claim 48, wherein the processor establishes the secure communication link by exchanging data with the host game console that can be used to derive a cryptographic key.

52. A system, comprising:
first and second game consoles with network connections to facilitate connection to a local area network, the first and second game consoles running a same game title and being configured to generate identical keys by virtue of running the same game title; and
the first game console being configured to discover the second game console by broadcasting messages over the local area network, the messages being secured by the keys.

53. A system as recited in claim 52, where in the first and second game consoles are configured to establish a secure communication link over the local area network by exchanging data used to derive a cryptographic key.

54. A system as recited in claim 52, where in the local area network comprises an Ethernet segment.

* * * * *